United States Patent [19]

Guthmann

[11] Patent Number: 4,458,389
[45] Date of Patent: Jul. 10, 1984

[54] ROPE WIDENING APPARATUS

[76] Inventor: Stephen F. Guthmann, 1 Brandon Rd., DeWitt, N.Y. 13214

[21] Appl. No.: 372,092

[22] Filed: Apr. 26, 1982

[51] Int. Cl.³ .............................................. F16G 11/04
[52] U.S. Cl. ................................. 24/122.6; 24/115 M; 52/223 L; 403/369
[58] Field of Search ................ 24/127, 115 M, 115 N, 24/136 L, 136 K, 136 R, 122.6; 29/444, 517; 52/223.2; 403/369

[56] References Cited

U.S. PATENT DOCUMENTS

| | | | |
|---|---|---|---|
| 440,582 | 11/1890 | Bahlsen | 24/122.6 |
| 1,909,332 | 5/1933 | Blackburn | 52/223 L |
| 1,958,747 | 5/1934 | Fiege | 24/122.6 |
| 2,017,887 | 10/1935 | Blackburn | 52/223 L |
| 2,032,567 | 3/1936 | Fiege | 24/122.6 |
| 2,935,776 | 5/1960 | Clark et al. | 403/369 |
| 3,450,829 | 6/1969 | Paul | 24/122.6 |
| 3,600,765 | 8/1971 | Rovinsky et al. | 24/122.6 |
| 3,829,937 | 8/1974 | Metzler | 24/115 M |
| 3,921,257 | 11/1975 | Appleby et al. | 24/115 M |
| 4,177,542 | 12/1979 | Denney | 24/122.6 |
| 4,295,250 | 10/1981 | Dupuy | 24/122.6 |

FOREIGN PATENT DOCUMENTS

| | | | |
|---|---|---|---|
| 443155 | 4/1927 | Fed. Rep. of Germany | 24/122.6 |
| 512893 | 9/1939 | United Kingdom | 24/122.6 |

Primary Examiner—Gene Mancene
Assistant Examiner—John G. Weiss

[57] ABSTRACT

A rope widening apparatus for use with tubular interlocking stranded rope comprising a rear tapered portion located on a generally football shaped insert to be placed within the strand groups of said rope, such that a force tending to draw the rope from the narrow to the large part of the taper will cause the strand groups to squeeze around the taper, and means to maintain the insert generally centrally disposed within the strand groups, and means to transfer the pulling force on the rope from the rear tapered portion to a desired object.

26 Claims, 16 Drawing Figures

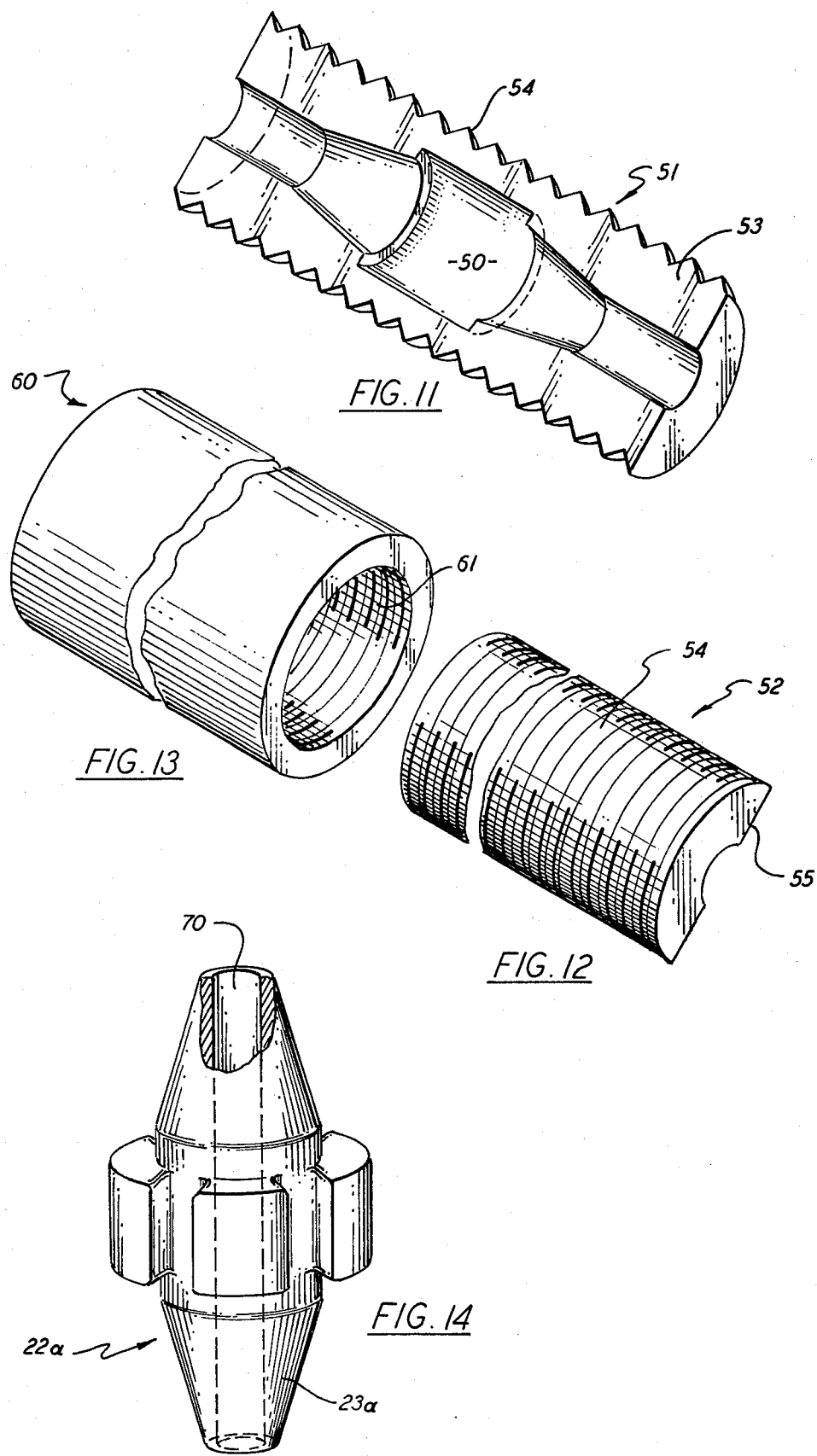

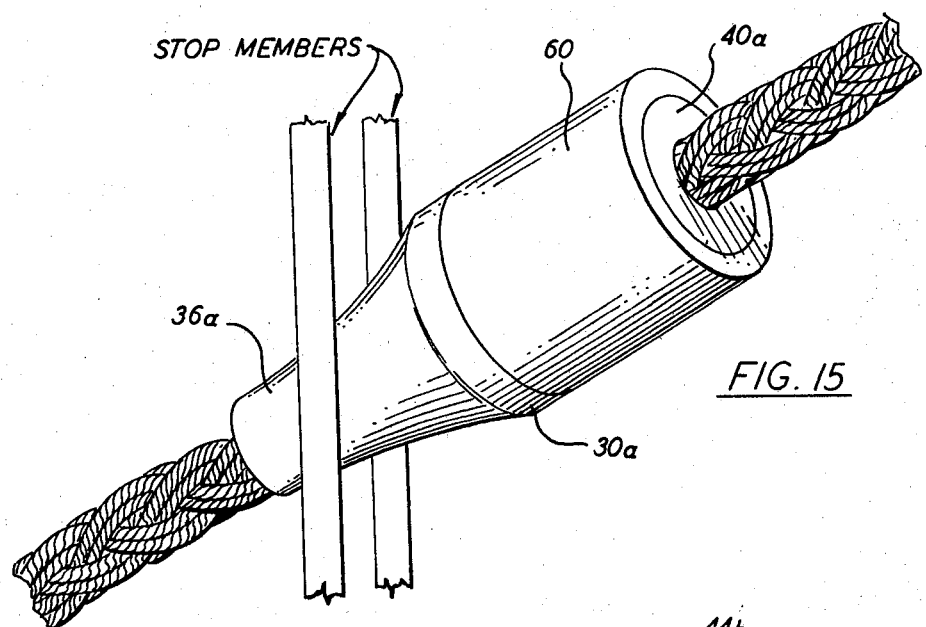
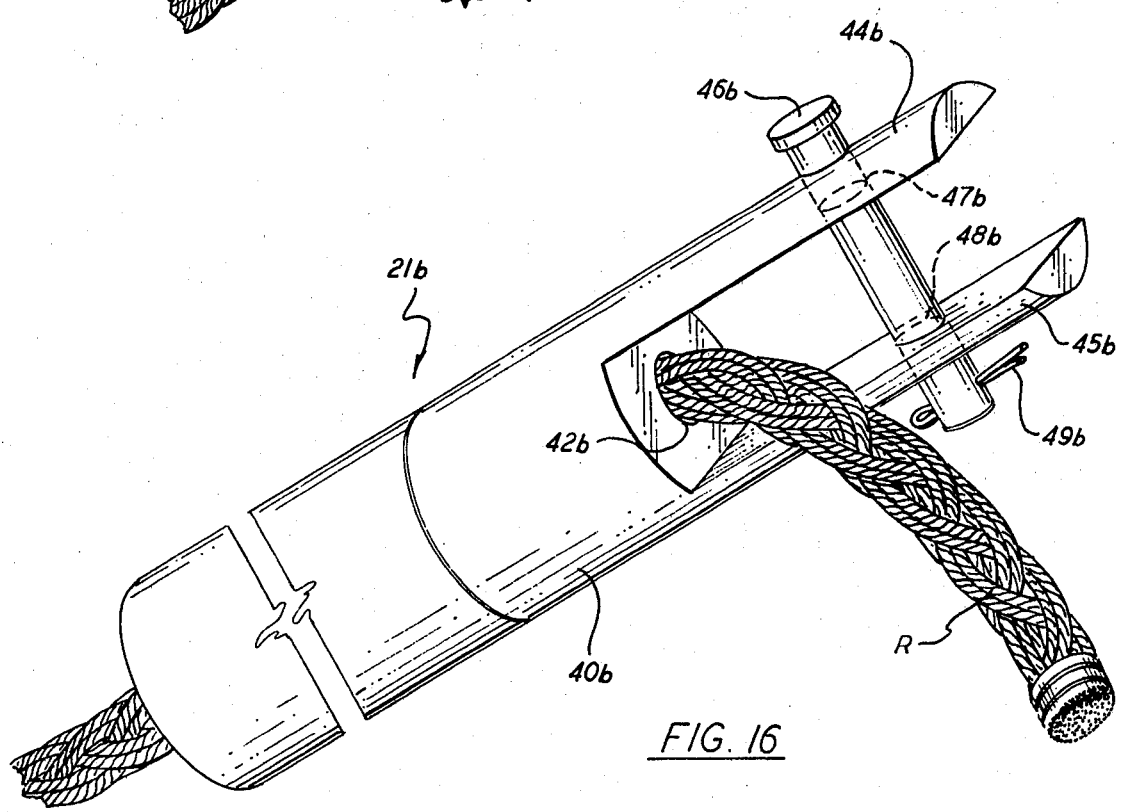

ROPE WIDENING APPARATUS

Please associate with this application the following disclosure documents:

| Date received by Patent Office Mail Room | Disclosure Document Number | Date of my letter | My check number |
|---|---|---|---|
| 30 Nov 81 | 104527 | 25 Nov 81 | NYBFS 327 |
| 20 Nov 81 | 104312 | 16 Nov 81 | NYBFS 325 |
| 09 Mar 81 | 098390 | 06 Mar 81 | NYBFS 256 |
| 12 Feb 80 | 088153 | 06 Feb 80 | NYBFS 188 |
| 09 Jul 79 | 082360 | 06 Jul 79 | NYBFS 128 |
| 18 Jun 79 | 081747 | 15 Jun 79 | NYBFS 121 |
| 11 Jun 79 | 081521 | 08 Jun 79 | NYBFS 117 |
| 08 Jun 79 | 081424 | 06 Jun 79 | NYBFS 115 |
| 09 Apr 79 | 079839 | 06 Apr 79 | NYBFS 107 |
| 02 Nov 77 | 065549 | 30 Oct 77 | FNCB 244 |

The inventor herein received assistance in the preparation of his application from Bertram Ottinger, Esq., registration #14,526.

BACKGROUND OF THE INVENTION

1. Field of the Invention

The present invention relates to devices for holding or widening tubular interlocking stranded rope or cable or of placing protuberances or bulges thereon which are immovable longitudinally along the rope. The bulge increases the diameter of the rope to create, for example, an abutment that prevents longitudinal movement of the rope past a mating abutment or stop member.

The words braid, plait, weave, intertwine, interlace or mesh have some similarity of meanings. For purposes of this patent they are deemed to be exactly synonymous. Herein they mean three or more strands or strand groups united to form a rope by intercrossing—that is, passing over and under each other—such that a rod passing transversly through the rope so formed is immovable longitudinally along the rope. The strand or strand groups of such rope may be said to interlock and such rope exhibits a locking phenomenon. This invention is for use with such interlocking stranded rope.

The word tubular herein means a rope in which the strands or strand groups thereof can be arranged to substantially surround an object. This invention is for use with such tubular rope.

That is, the type of rope intended to be used with this invention is tubular interlocking stranded rope as hereinabove defined.

2. Description of the Prior Art

Reduced to its most fundamental function, wherever rope is used, its purpose is to prevent two objects from moving apart more than a maximum distance from each other. Therefore, to be useful, a rope must be held at at least two points. To accomplish this objective, rope must be connected to each object, with one object connected at one point on the rope and the other connected at a point longitudinally spaced from the first point of connection. This is, decreased its resistance to tension. Furthermore, this inventor knows of no rope bulging method or connecting or widening device which employs the locking phenomenon of interlocking stranded rope as described herein, either alone or in combination with pressing surfaces.

It is the purpose of this invention to provide: (1) a longitudinally compact bulge of wide spot on the rope; (2) a quick releasable fixture for attaching rope; (3) a method of widening rope at intermediate points, as opposed to end points, so that the effective length of the rope and therefore the distance between two objects may be quickly adjusted; (4) to cover the rope at contact points of the attached object whereby to prevent line chafe; and (5) to be used in conjunction with the inventor's boat mooring apparatuses, described in U.S. Pat. Nos. 4,109,603 and 4,190,011 as an alternative form of a bulge.

SUMMARY OF THE INVENTION

A rope widening apparatus is provided for the use with tubular interlocking stranded rope. Its purpose is to provide a suitable site to attach the rope to a desired object without the use of a knot or eye splice, etc. The exterior of the rope widening apparatus may be so formed as to provide an abutting surface, so that the rope widening apparatus may be placed in contact with a stop member, such as found on the inventor's boat mooring apparatuses, to prevent the rope widening apparatus and therefore the rope from moving past the stop member when a tensile force is applied longitudinally on the rope and directed to draw the rope widening apparatus closer to, or tighter against, the stop member.

Alternatively, the exterior may be shaped as a shackle or to provide a mounting surface for various types of hooks or other attaching means.

An insert is adapted to be inserted within a tubular interlocking stranded rope. Protuberances, generally perpendicular to, or extending radially from a generally football shaped surface of the insert, and generally longitudinally centered, protrude between and past the strands of tubular interlocking stranded rope to orient the strands uniformly around the insert, to cause the strands to lock tighter as more tension is applied to the rope, and to be a connecting means between the football shaped insert and a stop member or other abutting surface. The locking phenomenon of tubular interlocking stranded rope is used to prevent the insert, and therefore the rope widening apparatus, from moving longitudinally along the rope.

The force applied on the rope to draw the outside abutting surface of the case of the rope widening apparatus tighter against the stop member, is also used to lock the strands behind and around a portion of the insert.

An overhand knot, as illustrated in the inventor's patents for boat mooring apparatuses (U.S. Pat. No. 4,109,603 and U.S. Pat. No. 4,190,011), will perform the same abutting function as will this apparatus, but may be unsatisfactory because, as is generally known, rope is weakened in tension by an overhand knot. Furthermore, an overhand knot is not as symmetrical or neat as is this device; nor is an overhand knot protected against chafing when abutted against a stop member, and may have a greater weakening effect on the rope than this rope widening apparatus. An object of this device is to widen the rope as an overhand knot does, but without incurring the aforementioned disadvantages, and such that the rope widening apparatus will not slide longitudinally along the rope, and that the rope widening apparatus will not be sheared off upon the application of a longitudinal tensile force.

BRIEF DESCRIPTION OF THE DRAWINGS

FIG. 11 is a perspective view of one half of an alternative embodiment of the case, showing the inside or cavity portion; this half is cut longitudinally to provide an alternative method of placing the case over the portion of the rope passing through the apertures and surrounding the insert.

FIG. 12 is a perspective view of the other half of the case shown in FIG. 11.

FIG. 13 is a perspective view of a sleeve used to hold together the two longitudinally cut case half portions shown in FIGS. 11 and 12, or the front case portion shown in FIG. 9 to the rear case portion shown in FIG. 10.

FIG. 14 is a perspective view with a partial section of an alternative embodiment of the insert with a longitudinal channel therethrough.

FIG. 15 is a perspective view of the embodiment of the front portion of the case shown in FIG. 9 and the embodiment of the rear portion of the case shown in FIG. 10, both held together by the sleeve shown in FIG. 13, and showing the chafe protecting abutting surface in contact with a stop member.

FIG. 16 is a perspective view of an alternative embodiment of the rear portion of the case shown in FIG. 8 with the addition of a shackle attaching arrangement.

DESCRIPTION OF A PREFERRED EMBODIMENT

Figure 1:
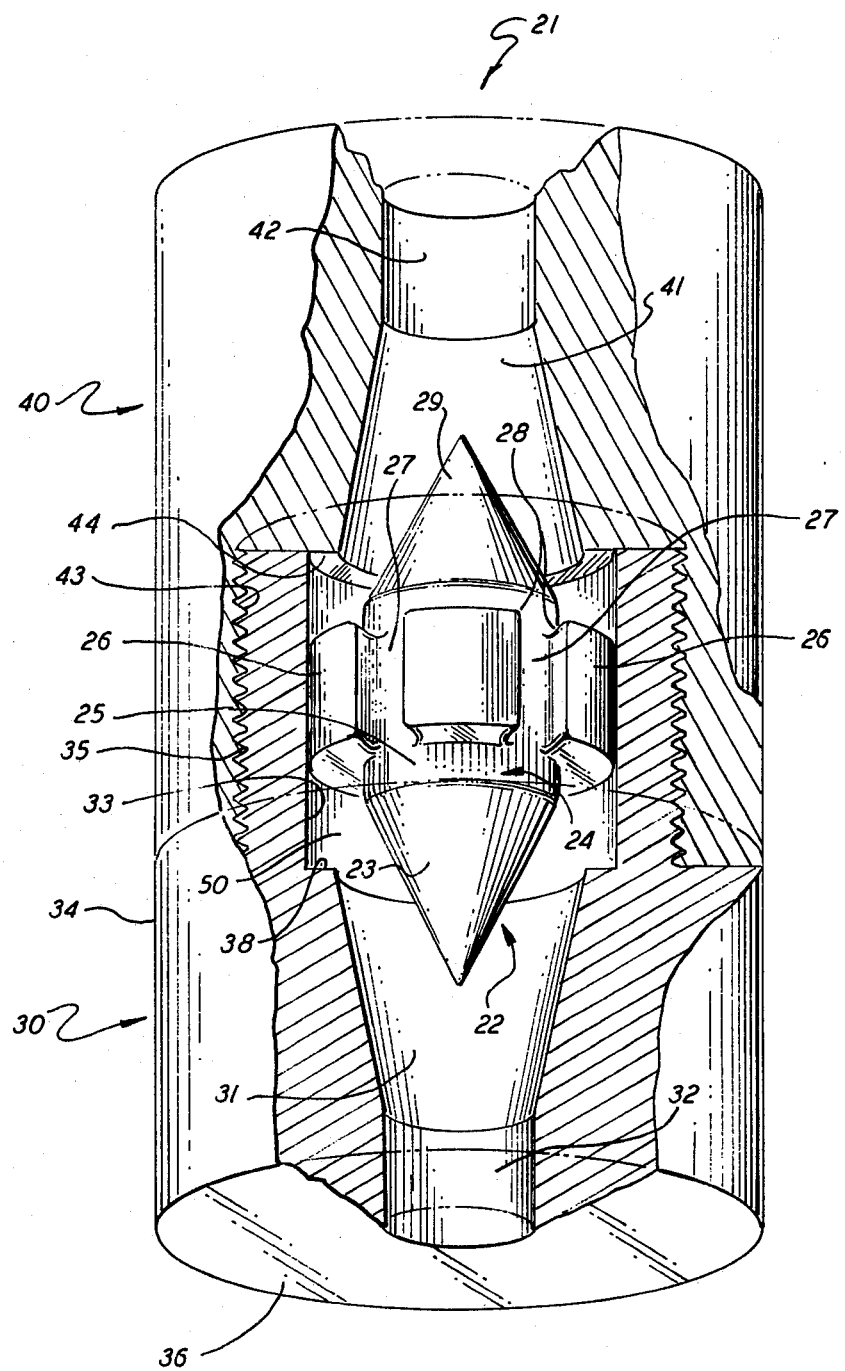
FIG. 1 is a perspective view, partially in section and partially in phantom, of a fundamental embodiment of the invention.
Figure 2:
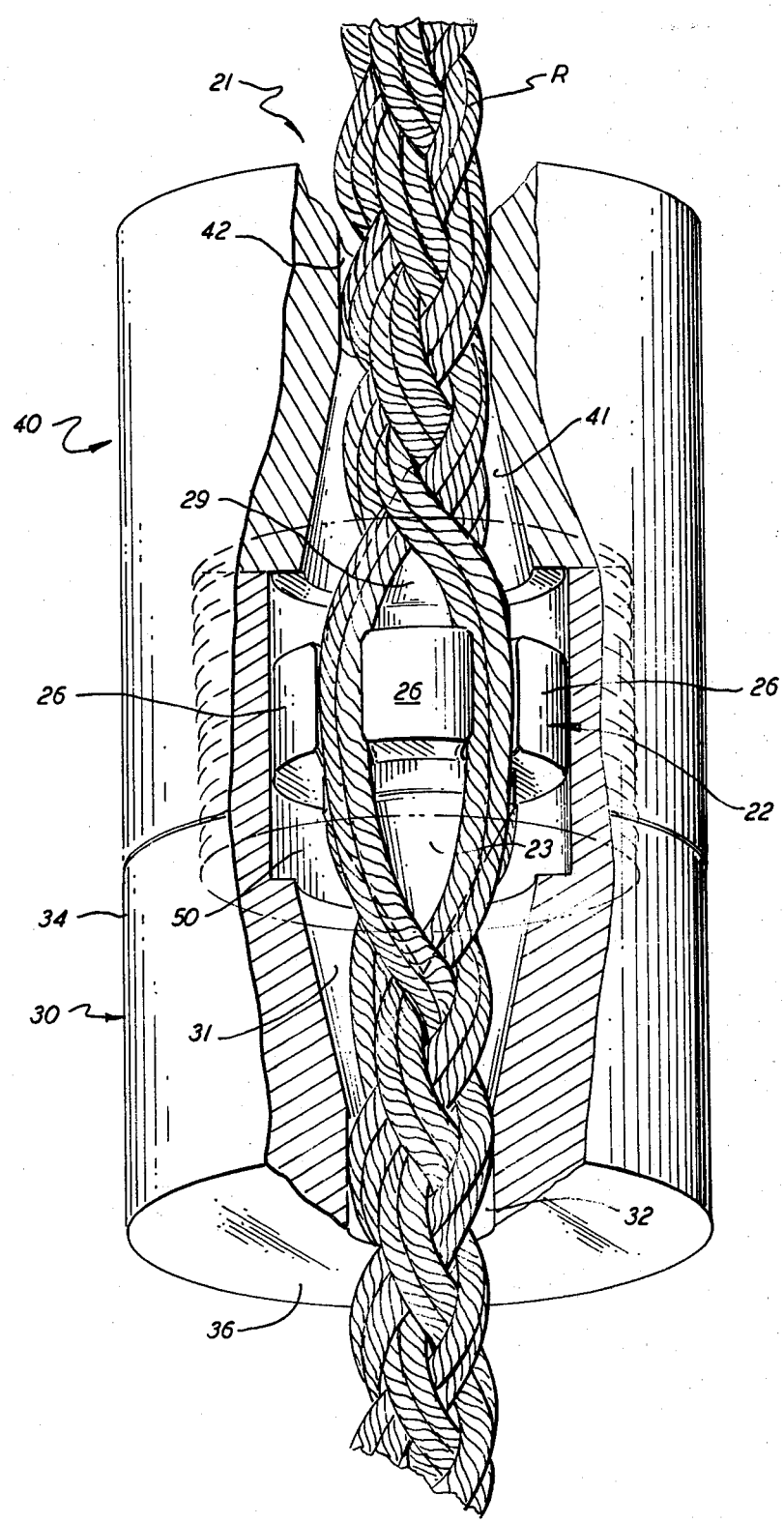
FIG. 2 is a perspective view, partially in section and partially in phantom, of a fundamental embodiment of the invention, but with the addition of a rope.
Figure 3:
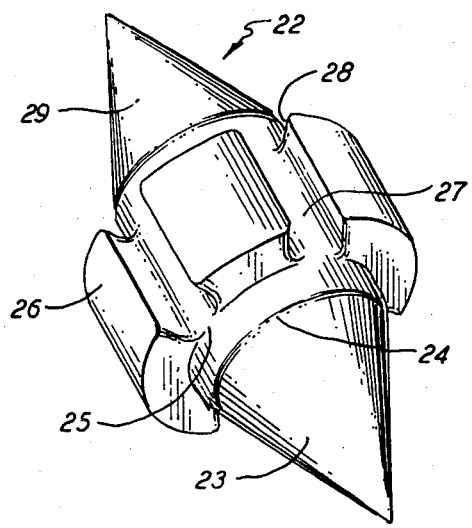
FIG. 3 is a perspective view of a fundamental embodiment of the insert shown in FIGS. 1 and 2.
Figure 4:
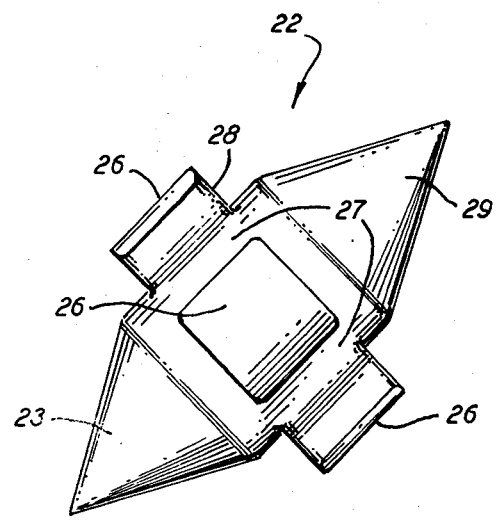
FIG. 4 is a side view of the insert, viewing a land perpendicularly.
Figure 5:
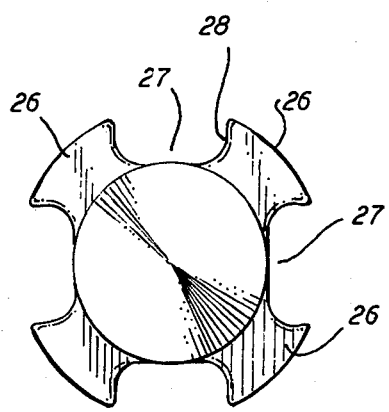
FIG. 5 is a back or front end view of the insert.
Figure 6:
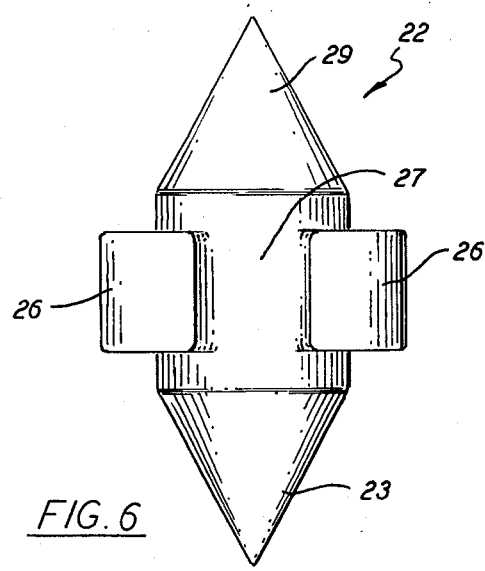
FIG. 6 is a side view of the insert, viewing a space or groove between lands perpendicularly.

Referring now to FIGS. 1 and 2, partial sectional and phantom perspective views of a preferred embodiment are shown, with FIG. 2 illustrating the components assembled in working relationship onto Rope R.

Rope R is one example of a tubular interlocking stranded rope. It has four strand groups with two strands in each strand group. It is tubular since the strands can be arranged to surround the insert 22. It is interlocking since the lands 26, when protruding between and past the strand groups, prevent the insert 22 from moving longitudinally along the rope by causing the strand groups to lock around, i.e. compress upon, the rear tapered portion 29, and to tighten behind the insert 22 upon the application of a longitudinal tensile force.

The appliance 21 has two fundamental components, namely an insert 22, of rigid material and a case of rigid material composed of two dissassemblable parts that in a preferred embodiment includes a case front portion 30 and a case rear portion 40. The case portions 30 and 40 mutually form a cavity 50 when assembled.

The insert 22, shown apart from the case in FIGS. 3 through 6, comprises a generally football shaped surface 24, of which the portion 23 is the forward tapered, e.g. conical, portion thereof and the portion 29 is the rear tapered, e.g. conical, portion thereof. A group of lands 26 protrude radially from the surface 24 at a generally central cylindrical portion 25 thereof to define grooves 27 that have a component extending longitudinally of the insert. There is one protruding land and one associated groove for for each strand group for the rope illustrated.

As shown in FIG. 2, a section of the strand groups of rope R pass between lands 26 with each strand group lying in an associated groove 27 such that the rope is substantially symmetrically disposed about the insert 22. It is also possible to use one half the number of lands such that two strand groups lie in each associated groove, although such may not be the best configuration of the insert 22 for use with the rope herein illustrated.

The rear and upper side surfaces 28 of the lands 26 cause the strand groups to lock around and behind the rear tapered portion 29 and therefore behind the insert 22; thus preventing the rope from being drawn longitudinally further through the aperture 32 and out of the cavity 50.

The cylindrical central portion 25 of the insert 22 has a diameter short enough to allow the strand groups of the rope, when symmetrically disposed thereabout, to fit within the cylindrical cavity surface 33 of the case front portion 30.

Figure 7:
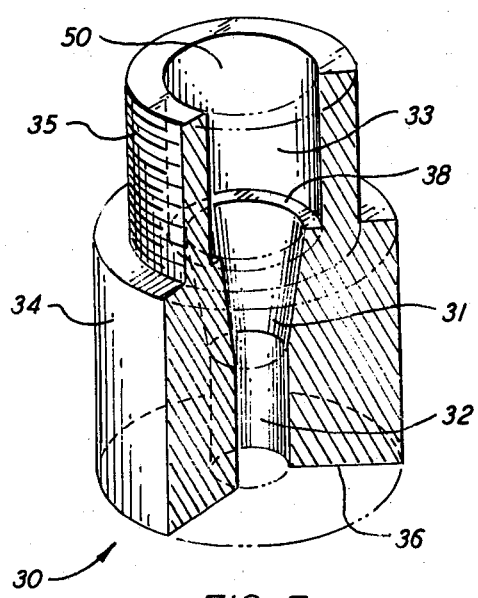
FIG. 7 is a perspective view, partially in section and partially in phantom, of the front portion of the case shown in FIGS. 1 and 2.

The case front portion 30, shown separately in FIG. 7, comprises a central bore including a concave frustum surface 31, a narrow cylindrical aperture 32 aligned along the longitudinal axis of the concave frustum surface 31, whose diameter is the same as the diameter of the small circle of the concave frustum surface 31, and a wide cylindrical surface 33 also aligned along the longitudinal axis of the concave frustum surface 31 whose diameter is wider than the diameter of the larger circle of the concave frustum surface 31. The large circle of the concave frustum surface 31 and the cylindrical surface 33 are joined by an interior abutting surface 38. The outside surface of the case front portion includes a large diameter cylindrical segment 34 which is approximately coextensive with the surface 31 and the aperture 32. Said outside surface includes a male threaded cylindrical extension 35 which is approximately coextensive with the surface 33. The outside surface of the case front portion also includes an exterior abutting surface 36 the plane of which is approximately perpendicular to the longitudinal axis of the central bore.

The purpose of the case front portion is to keep the rope from falling away from the insert at those times when there is no tension on the rope, to cover the rope so as to prevent line chafe, and in this example, to provide abutting surfaces 38 and 36 to transfer a longitudinal tensile force from the lands 26 of the insert 22 to a stop member or other desired object.

Figure 8:
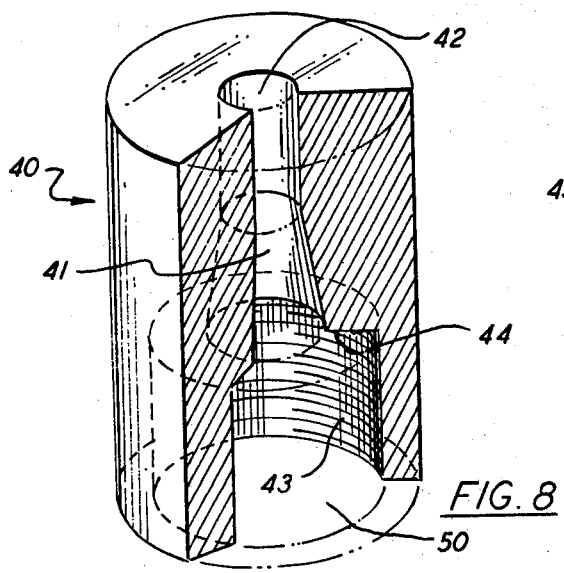
FIG. 8 is a perspective view, partially in section and partially in phantom, of the back portion of the case shown in FIGS. 1 and 2.

The case rear portion 40, shown separately in FIG. 8, comprises a central bore including a concave frustum surface 41, a narrow cylindrical aperture 42 alligned along the longitudinal axis of the concave frustum surface 41, whose diameter is the same as the diameter of the small circle of the concave frustum surface 41, and an interior abutting surface 44 at the large circle of the concave frustum surface 41. The diameter of the inner circle of the surface 44 is the same as the diameter of the large circle of the concave frustum surface 41, and the diameter of the periphery of the surface 44 is the same as the diameter of the cylindrical surface 33 of the case front portion 30. There is also an internal threaded portion 43 matable with the externally threaded extension 35, of the case front portion 30 so that the case rear portion 40 may be threadibly secured to case front portion 30. However, case portions 30 and 40 may be secured in any suitable manner, for example, by a bayonet joint to complete the formation of cavity 50.

The purpose of the case rear portion 40 is to prevent the insert 22 from falling out of the case front portion 30, to help align the rope R symmetrically around the rear conical portion 29, and to prevent an irregular, e.g. cocked to one side strand orientation when the strands lock tightly upon the application of a longitudinal tensile force on the rope R in a direction which would first tend to empty the cavity 50 and then tend to empty the aperture 32 of rope.

To prevent the insert 22 with the rope disposed thereabout from falling out of the cavity 50, the diameter of the cylindrical aperture 42 is less than the diameter of the insert 22 at the central cylindrical portion 25 and the lands 26, and is sufficiently long to allow the unenlarged diameter of the rope R to pass therethrough, and therefore short enough to prevent the rope R from passing therethrough at that portion of the rope R disposed over the insert 22. That is, the aperture 42 provides a slidable snug fit around an unexpanded portion of the rope R and also helps prevent irregular strand group orientation. The concave frustum surface 41 may also help provide a slidable snug fit of that portion of the rope R disposed over the tail cone 29, to help prevent irregular strand orientation, depending on the bulk of the rope.

All surfaces and corners of the cavity 50, the apertures 32 and 42, and all insert surfaces touching the rope are rounded and smooth so that the rope R will be neither cut nor abraided, nor the strand groups pierced.

Now describing the operation of the rope widening apparatus 21, the surface 36 of the case front portion 30 is an abutting surface. It may be placed in contact with any appropriate stop member. Examples of such stop members are shown in U.S. Pat. Nos. 4,109,603 and 4,190,011 describing the inventions of boat mooring apparatuses. The appliance 21 may be placed at desired intermediate point(s) on a rope to provide an abutting or attaching means for the rope. When the abutting surface 36 is placed in contact with a stop member and the rope R is drawn longitudinally in a direction from aperture 42 through cavity 50 and towards aperture 32, the rope will be prevented from sliding through and out of the cavity 50 and therefore out of the appliance 21, because the lands 26 of the insert 22 abut against the surface 38 and cause the strand groups to lock around and behind the insert 22, and more specifically behind the rear and upper side surfaces 28 of the lands 26 and around the rear tapered portion 29 of surface 24.

The lands 26 maintain the rear tapered portion 29 (and therefore the football shaped surface 24) centrally located within the strand groups; and also are a connecting means between a stop member, which in this embodiment, transfers a longitudinal tensile force on the rope from the surface 29 to the surface 38, then to the surface 36 and ultimately to a stop member.

It may be observed that when a tensile force is pulling from a direction from the case front portion 30 to the case rear portion 40, and therefore from the forward tapered portion 23 to the rear tapered portion 29, that is, the rope tends to move in a direction from aperture 42, over the insert 22 and through cavity 50 and out of aperture 32, the strand groups compress longitudinally behind the rear tapered portion 29 and expand longitudinally in front of tapered portion 23. For another way, there are more strand group crossover points per linear inch of rope behind the insert than in front of it. Therefore, it may be observed that the rope becomes shorter behind the insert and longer in front of the insert upon the application of a longitudinal tensile force.

It may also be observed that upon the application of a longitudinal tensile force, the strand groups transversely compress around the rear tapered portion 29. That is, the strand groups lock tighter around the rear tapered portion 29 and the longitudinal tensile force is spread around the rear tapered portion 29.

It is not desirable, although it may happen depending on the shape of the insert, the nature of the rope and the amount of tension on the rope, that the lands 26 hook into the vertices created by the crossovers of the strand groups, because the lands 26, notwithstanding that their rear and upper side surfaces 28 are rounded, may act as an edge over which the strands may be cut.

The forward tapered portion 23 guides the rope over a smooth surface between the expanded and unexpanded portion of the rope to eliminate an edge over which the rope can be cut.

Under a tensioned condition, the rope R would be drawn out of the cavity 50, without the utilization of the locking phenomenon of the tubular interlocking stranded rope, as provided by the invention herein disclosed, and more specifically by the protruding lands 26, the surfaces 28 thereof and the rear conical portion 29 of the insert 22.

As mentioned hereinabove, only tubular interlocking stranded rope can be used. In contrast, a braided flat band is an example of an interlocking stranded item that is not suitable for use with this invention (unless it can be arranged uniformly and substantially to surround an object) because it can only be held by a rod or a series of rods or threads passing transversely between the strands or strand groups. Also in contrast, a common three strand twisted rope is not suitable for use with this invention, although the strands can be arranged to uniformly and substantially surround an object (thereby meeting the tubular requirement) because the strands cannot be caused to lock around and behind the insert.

The insert 22 may be placed into the tube-like structure formed by the strand groups of the rope R by any suitable method of loosening the interlocking strand groups and expanding the diameter of the rope sufficiently so that the insert 22 may be symmetrically placed therebetween. For example, the tube can be compressed longitudinally and the strands drawn manually in a longitudinal direction between two points spaced equidistantly from the zone desired to be expanded. This results in the desired transverse expansion accompanied by relative loosening of the strands, one from another, at the expanded zone whereby to permit the insert to be slipped between the strands for location in the hollow center of the rope at said zone. The interlocking strand groups are then drawn snug onto the insert 22 so that an equal number of strand groups of the rope R are drawn adjacent to each land 26 and into each associated groove 27 of the insert 22.

In addition, the insert 22 may be placed within the strand groups of the rope during the manufacturing process of the rope prior to intercrossing the strand groups at the zone of insert placement.

The case front portion 30 and the case rear portion 40, while separated, are placed over the insert 22 and the rope R by feeding one end of the rope R through the aperture 32, the other end of the rope R through the aperture 42, and screwing the case portions 30 and 40 together so as to form cavity 50, enclosing the insert 22 therein. That is to say, the separated two halves of the case are threaded onto the rope in proper orientation before or after the insert is placed inside the rope, after which the two halves are joined.

Alternatively, rather than using two disassemblable case portions, given a suitable material, the case may be moulded over that portion of the rope disposed over the insert so that the case is one piece and not disassemblable.

Furthermore, the lands 26 illustrated herein abut against an inside surface portion of the case (38 and 44). However, the lands might protrude through the outside of the case so that they alone act as an exterior abutting surface. That is, the case may be a mere collar or collars whose only functions are to keep the rope from falling away from the insert when the rope is slack, and to prevent an irregular strand orientation when the rope is under tension. Therefore, there would be no abutting surfaces 36 and 38. However, such a configuration may not be the neatest or most practical form of the appliance 21.

Figure 9:
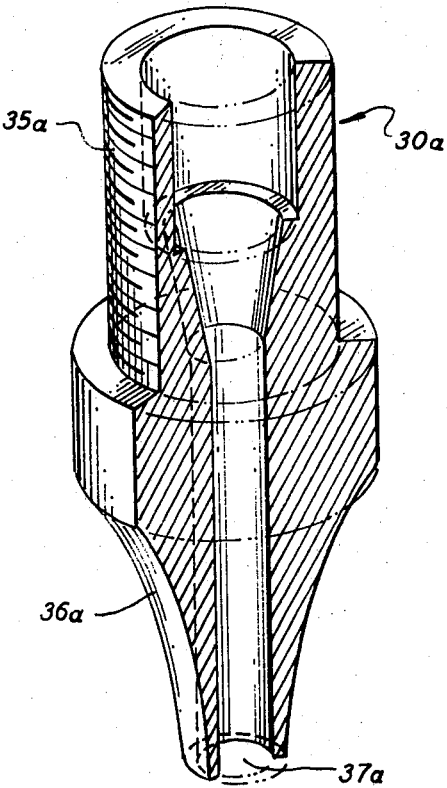
FIG. 9 is a perspective view shown partially in section and partially in phantom, of an alternative embodiment of the front portion of the case with the addition of a chafe protecting abutting surface, and with much of its exterior surface threaded to accept an internally threaded sleeve.

Now describing various alternative embodiments, FIGS. 9 and 15 show a case front portion 30a wherein the abutting surface 36a is an approximately conical shape with the narrow segment near the orifice 37a becoming generally cylindrical. As shown in FIG. 15, the stop members are placed sufficiently far apart to allow insertion of the narrow segment but close enough together to prevent the rope widening apparatus from passing the stop members when a longitudinal tensile force is applied to the rope. The purpose of the narrow segment of the abutting surface 36a is to permit insertion thereof between the stop members and to touch the surfaces of the stop members so that the rope R will not touch and be abraided by rubbing against the surfaces of the stop members.

Figure 10:
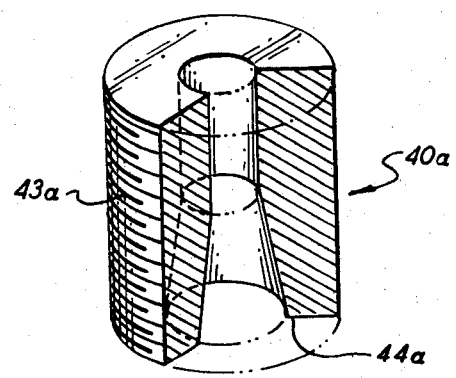
FIG. 10 is a perspective view shown partially in section and partially in phantom, of an alternative embodiment of the back portion of the case, but with its exterior surface threaded to accept an internally threaded sleeve.

Also as shown in FIG. 9, much of the exterior surface of the case front portion 30a has external threads 35a to be mated to the internal threads 61 of the sleeve 60 shown in FIG. 13. The threads 61 are also adapted to fit the external threads 43a of the case rear portion 40a shown in FIG. 10. The case rear portion 40a differs from the case rear portion 40 shown in FIG. 8 only in the external threads. The case rear portion 40a may therefore be used in conjunction with the case front portion 30a.

FIG. 15 also shows the case front portion 30a, the case rear portion 40a and the sleeve 60 mounted over the rope R and threaded together, and in operation. FIG. 15 assumes that the portion of the rope R within the case portion is disposed over an appropriate insert. The operation and construction of the case front portion 30a, and the case rear portion 40a and the sleeve 60 are otherwise substantially the same as the embodiment shown in FIGS. 1 and 2, and will not be further described herein.

Another alternative embodiment of the case is shown in FIGS. 11 and 12. The case portions 51 and 52 are longitudinal sections to provide an easier method of placing the rope R, previously disposed over insert 22 in the usual fashion, into cavity 50. A longitudinal half of cavity 50 is on each of longitudinal case portions 51 and 52. Mating exterior threads 54 are on the outer curved surfaces of the longitudinal case portions 51 and 52 so that when the surfaces 53 and 55 of the longitudinal case portions 51 and 52 respectively are placed together, thereby forming cavity 50, the sleeve 60 shown in FIG. 13 with internal mating threads 61, may be threadibly placed onto external thread portion 54 to securely hold the longitudinal case portions 51 and 52 together. In addition, a lock nut may be used in conjunction with the sleeve 60.

After a number of inserts are mounted within the strands of a rope at desired intervals, the rope may be drawn through the same number of sleeves 60 and the sleeves placed next to the sections of the rope where the inserts are mounted. Because, of course, the inside diameters of the sleeves 60 are larger than the outside diameters of the inserts mounted within the rope strands. Then case half portions 51 and 52 may be placed over the inserts and the sleeves threaded over them. The operation and construction of longitudinal case portions 51 and 52 are otherwise substantially the same as case portions 30 and 40 and will not be further described herein.

This discussion has described the operation of the rope when pulled in one direction. However, because both the insert and the cavity are longitudinally symmetrical, a tensile force may be applied to the rope in either direction, assuming appropriate external surfaces and stop members.

Another alternative embodiment of the insert 22 is shown in FIG. 14 and labeled 22a. It differs from insert 22 in that there is a longitudinal channel 70 passing through the insert. Therefore, the forward convex conical portion 23 becomes a forward convex frustum portion 23a. A case is appropriately adapted to receive the insert. The purpose of the channel 70 is to allow a cable such an an electrical cable, etc., to pass therethrough, and through the tube formed by the rope, thereby protecting the cable from a longitudinal tensile force, as this force is taken up by the rope and insert. The operation and construction of insert 22a is otherwise substantially the same as that of insert 22 and will therefore not be further described herein.

FIG. 16 shows an alternative embodiment of the case rear portion 40 and is labeled 40b. It differs from the case rear portion 40 in that the fork-like extensions 44b and 45b in conjunction with clevis pin 46b passing through aligned apertures 47b and 48b form a shackle. The shackle may be attached in the conventional manner to an appropriate eye piece on a desired object. The cotter pin 49b passes through a transverse bore in the clevis pin 46b and is used in the conventional manner to prevent the clevis pin 46b from falling out of aligned apertures 47b and 48b and therefore from losing contact with the fork-like extensions 44b and 45b.

FIG. 16 also shows the tail end of the rope R emerging from the aperture 42b. Assuming that the rope R is not abraided inside the case portions and therefore will not tear, as long as the tail end of the rope R remains braided, the rope R will not be drawn out of the rope widening apparatus 21b. To keep the rope R from unraveling, i.e. to prevent the interlocking strands behind the insert from opening and therefore losing the locking effect of the interlocking strands, it is best to whip the end of the rope R. If however, the aperture 42b is long enough to contain sufficient crossover points, such whipping of the end of the rope R may not be absolutely necessary.

For clarity, the drawings show some parts of the inserts and cases with sharp corners. However, the embodiments of the invention function best when all surfaces touching the rope are smooth and without corners so that the rope will be neither abraided nor cut, nor the strand groups pierced by, for example, a point on a conical portion of the insert. Further, the rope widening apparatus should be so constructed that the rope makes as few bends as possible, and such bends as are present should have the longest radii possible, so that the rope is as free of stress concentration points as possible. As one means to this object, the forward conical portion 23 of the insert 22 is used, rather than an abrupt edge forward of the section of lands 26 and grooves 27, to guide the rope over a smooth surface between the expanded and unexpanded portion.

Furthermore, the tapers 29 and 23 may be curved as a football or have an ogee or open S curve, depending on which shape proves to have the least weakening effect on any given variation of strand group arrangement.

However, regardless of taper shape, the tapers must be smooth. They should be as polished as possible. They must be neither abrasive nor have hooks, as shown in Dupuy, U.S. Pat. No. 4,295,250, as such would tend to tear the rope fibers and serve no purpose. The tapers must neither be fluted nor have lands and grooves nor ridges, neither helical, nor longitudinal, as shown in Rovinsky, U.S. Pat. No. 3,600,765, nor transverse, as it is believed that such would create points over which force in the rope would concentrate when the rope is under tension. Because, the strand groups change their angular relationship, one to another, with changes in tension, and would therefore not remain in any grooves on a taper. Furthermore, it is believed that longitudinal or helical grooves on the rear taper 29, in which the strand groups might nest, would tend to reduce the compressive effect of the strand groups on the rear taper 29 when the rope is under tension and therefore reduce the holding effect of the taper 29.

There are numerous variations of tubular interlocking stranded rope (made of various fibers, e.g. nylon, polyester, metal, etc.), each with its own number and unique configuration of strands and strand groups. For each such configuration a specially configured insert may be used, with an appropriate number of lands extending radially from the surface of the insert and protruding between and past the interlocking strand groups. Therefore, for a rope with, say sixteen strand groups, an insert may be designed with sixteen lands and grooves.

Alternatively, the principles disclosed in this patent, using the example of the 4-land-4-groove insert shown herein, may also be applied to rope with other than 4 strand groups or with rope having an outer set of tubular interlocking strands disposed over an inner set of tubular interlocking strands. That is, it is not necessary that the number of lands and grooves of the insert be equal to the number of strand groups of a given tubular interlocking stranded rope. For example, tubular interlocking stranded rope known as yacht braid or double braid may be used. Such a rope may have an inner tube of 8 strand groups, with 4 strands in each strand group. Therefore, each groove of the 4-land-4-groove insert would receive two strand groups or 8 strands. The outer tube of such a rope may have sexteen strand groups, with 2 strands in each strand groups. Therefore, each groove of the 4-land-4-groove insert would receive 4 strand groups with also 8 strands.

As another example, a yacht braid or double braid rope may have the same inner tube configuration as in the example above, but with an outer tube of twenty strand groups, with two strands in each strand group, and with 10 strand groups turning left and ten strand groups turning right. Therefore, from the ten strand groups turning right, three strand groups would be disposed in one groove. In the adjacent groove, two strand groups would be disposed. In the next adjacent groove, three strand groups would be disposed; and in the next adjacent groove, two strand groups, for a total of ten strand groups. The strand groups turning left would be disposed in the grooves in the same way as the strand groups turning right. But, in those two grooves wherein there are disposed three right turning strand groups, there would be disposed two left turning strand groups. And, in those two grooves where there are disposed two right turning strand groups, there would be disposed three left turning strand groups. Thus, making a total of five strand groups in each groove and 20 strands groups in the four grooves. And, thus disposing the rope symmetrically around the insert.

Although metal section lines were chosen for the drawings of the insert and case, it is to be understood that any other suitable rigid material such as plastic, nylon or the like may be used. While preferred embodiments have been shown and described, it is to be understood that numerous changes can be made without departing from the essence and scope of the invention, as set forth herein and in the appended claims.

I claim:

1. A rope widening apparatus for use with tubular interlocking stranded rope, comprising an insert to be placed within a transversely expanded portion of said rope, comprising a smooth and ungrooved tapered surface around which strands or strand groups of said rope transversely compress upon the application of a longitudinal tensile force on said rope, and to provide the strands or strand groups with a gradual transition from the unexpanded portion of said rope adjacent to said insert to the point of maximum transverse expansion of said rope, and means adjacent to the large end of said smooth and ungrooved tapered surface for maintaining the strands or strand groups in symmetrically surrounding relationship to said smooth and ungrooved tapered surface, and radial lands between said smooth and ungrooved tapered surface to points exterior of said rope to abut against a stop member, to enable said smooth and ungrooved tapered surface to hold the rope against a longitudinal tensile force, and another smooth and ungrooved tapered surface, whose large end is adjacent to said maintaining means, to provide the strands or strand groups with a gradual transition from the point of maximum transverse exansion of said rope to the other unexpanded portion of said rope adjacent to said insert; and containment means overlying said rope to help keep the rope disposed over said insert.

2. An apparatus in accordance with claim 1 wherein said insert comprises at least two radially protruding lands adapted to abut against a surface located on the containment means overlying said rope.

3. An apparatus in accordance with claim 1 wherein said insert has an aperture passing longitudinally therethrough.

4. An apparatus in accordance with claim 1 wherein said containment means overlying said rope comprises a case with at least one interior abutting surface abuttable with said radial lands and having at least one exterior abutting surface.

5. An apparatus in accordance with claim 1 wherein said radial lands overlying said rope comprises a case adapted to pass said connecting means therethrough.

6. An apparatus in accordance with claim 1 wherein said containment means overlying said rope comprises a case with at least two dissassemblable portions and means to hold said portions in assembled relationship.

7. An apparatus in accordance with claim 1 wherein said containment means overlying said rope comprises means providing an aperture located behind the insert whose diameter is large enough to pass a transversely unexpanded portion of said rope but too small to pass the portion of said rope transversely expanded over said insert, to provide a slidable snug fit of said transversely unexpanded portion of said rope.

8. An apparatus in accordance with claim 1 wherein said containment means overlying said rope comprises at least one projection protruding from said insert and adapted to extend past the strands of said rope disposed over said insert.

9. An apparatus in accordance with claim 1 wherein said containment means overlying said rope comprises means providing attaching means to enlarge said radial lands of said insert.

10. A tubular interlocking stranded rope in combination with a rope widening apparatus as in claim 1.

11. A tubular interlocking stranded rope in combination with a rope widening apparatus as in claim 1 comprising a plurality of said rope widening apparatuses disposed in spaced apart relation, one from another, along the length of said rope.

12. A rope widening apparatus for use with tubular interlocking stranded rope, comprising a football shaped insert with at least two radial lands defining grooves between the radial lands, and positioned at a central surface portion of said insert, with the other surface portions of said insert being smooth and ungrooved, said insert to be symmetrically placed within the strands or strand groups of said rope at a transversely expanded portion of said rope, with said strands or strand groups lying in the grooves defined by the radial lands, with the radial lands of sufficient length to extend radially past the strands or strand groups, said insert comprising means for tightening the interlocking strands or strand groups of said rope around said insert upon the application of longitudinal tensile force on said rope, and comprising means for providing the strands or strand groups with a gradual transition between unexpanded portions of said rope and the expanded portion of said rope, and a case comprising a cavity, comprising a concave cylindrical surface which is partially closed by a ring at at least one end, the outer circle of said ring being the same diameter as said concave cylindrical surface, said concave cylindrical surface having a diameter large enough to allow said radial lands of said insert to fit therein, the inner circle of said ring being too narrow to allow said radial lands of said insert to pass therethrough, but large enough to allow a portion of the rope disposed over said insert to pass therethrough, thereby said radial lands of said insert will abut against said ring.

13. An apparatus in accordance with claim 12, wherein said radially protruding lands are of equal length.

14. An apparatus in accordance with claim 12, wherein at least a portion of the exterior surface of the case forms an abutting surface for use with a stop member.

15. An apparatus in accordance with claim 12, comprising means to prevent the rope disposed over the insert from falling out of the inside surface of the case.

16. An apparatus in accordance with claim 12, comprising means to orient rope strands symmetrically around the insert.

17. An apparatus in accordance with claim 12, wherein said case includes at least two mating portions which when separated expose the cavity for reception of the transversely expanded rope portion, and means to hold said portions in assembled relationship.

18. An apparatus in accordance with claim 12 or claim 17, wherein said case includes at least two mating portions divided along a transverse plane and means to hold said portions in assembled relationship.

19. An apparatus in accordance with claim 12 or claim 17, wherein said case includes at least two mating portions divided along a longitudinal plane and means to hold said portions in assembled relationship.

20. An apparatus in accordance with claim 12, wherein said case consists of one ridged unit disposed over the expanded portion of said rope.

21. An apparatus in accordance with claim 12, wherein said case comprises two rings at opposite ends of said concave cylindrical surface which partially close said concave cylindrical surface at each end.

22. An apparatus in accordance with claim 12, wherein at least a portion of the exterior surface of the case comprises means to prevent the rope from abraiding against the surface of a stop member.

23. An apparatus in accordance with claim 12, wherein the insert has means providing an aperture passing longitudinally therethrough.

24. An apparatus in accordance with claim 12, wherein a portion of the exterior surface of the case is in the form of a shackle.

25. A tubular interlocking stranded rope in combination with a rope widening apparatus as in claim 12.

26. A tubular interlocking stranded rope in combination with a rope widening apparatus as in claim 12 comprising a plurality of said rope widening apparatuses disposed in spaced apart relation, one from another, along the length of said rope.

* * * * *